United States Patent
Kim

[19]

[11] Patent Number: 5,857,114
[45] Date of Patent: Jan. 5, 1999

[54] DMA SYSTEM FOR RE-ARBITRATING MEMORY ACCESS PRIORITY DURING DMA TRANSMISSION WHEN AN ADDITIONAL REQUEST IS RECEIVED

[75] Inventor: Sun-gi Kim, Seoul, Rep. of Korea

[73] Assignee: SamSung Electronics Co., Ltd., Kyungki-do, Rep. of Korea

[21] Appl. No.: 775,188

[22] Filed: Dec. 30, 1996

[30] Foreign Application Priority Data

Dec. 30, 1995 [KR]   Rep. of Korea ................... 1995-69750

[51] Int. Cl.⁶ ................................................... G06K 13/14
[52] U.S. Cl. ........................... 395/842; 395/728; 395/672; 395/673; 395/674; 395/293; 395/858; 711/100; 711/427; 711/150; 711/200
[58] Field of Search ..................... 395/842, 845, 395/846, 847, 848, 729, 732, 737, 672, 673, 674, 293, 858; 711/100, 427, 156, 200

[56] References Cited

U.S. PATENT DOCUMENTS

| | | | |
|---|---|---|---|
| 4,475,155 | 10/1984 | Oishi et al. ............................... | 364/200 |
| 4,722,051 | 1/1988 | Chattopadhya .......................... | 364/200 |
| 4,912,632 | 3/1990 | Gach et al. .............................. | 364/200 |
| 4,987,529 | 1/1991 | Craft et al. ............................... | 364/200 |
| 5,016,165 | 5/1991 | Tanikawa et al ........................ | 364/200 |
| 5,018,098 | 5/1991 | Taniai et al. ............................. | 364/900 |
| 5,278,965 | 1/1994 | Fujihira et al. .......................... | 395/425 |
| 5,299,320 | 3/1994 | Aono et al. .............................. | 395/375 |
| 5,313,607 | 5/1994 | Tokumaru ................................ | 395/425 |
| 5,333,294 | 7/1994 | Schnell .................................... | 395/425 |
| 5,471,639 | 11/1995 | Harrington ............................... | 395/842 |
| 5,551,054 | 8/1996 | Packer ..................................... | 395/843 |
| 5,553,248 | 9/1996 | Melo et al. .............................. | 395/296 |
| 5,561,821 | 10/1996 | Gephardt et al. ........................ | 395/848 |
| 5,623,622 | 4/1997 | Yuki et al. ............................... | 395/427 |

*Primary Examiner*—Thomas C. Lee
*Assistant Examiner*—Doug Rupert
*Attorney, Agent, or Firm*—Robert E. Bushnell, Esq.

[57] ABSTRACT

A DMA controlling device is provided. The DMA controlling device includes a DMA control register for storing an instruction, which is transmitted to the DMA controlling device by the microprocessor for the DMA transmission: a DMA count register for recording a number of DMA transmission; means for generating the address of the source memory during the DMA transmission; means for generating the address of the destination memory during the DMA transmission; a DMA data buffer for temporarily storing data of the source memory before the data of the source memory is transmitted to the destination memory; DMA arbitrating means for arbitrating a memory access priority upon the occurrence of each the DMA transmission cycle when the memory access request is received from at least one master intending to use one of the source and destination memories during the DMA transmission; and DMA engine controlling means for requesting the memory access priority from the DMA arbitrator, transmitting memory control signals to a master which has the memory access priority, and transmitting information regarding the DMA transmission frequency to a DMA count register. Therefore, the performance of a multiprocessor system requiring high speed balanced with a minimum pause time can be improved by supporting a DMA transmission cycle together with a general processor cycle.

6 Claims, 3 Drawing Sheets

DMA SYSTEM FOR RE-ARBITRATING MEMORY ACCESS PRIORITY DURING DMA TRANSMISSION WHEN AN ADDITIONAL REQUEST IS RECEIVED

CLAIM OF PRIORITY

This application make reference to, incorporates the same herein, and claims all benefits accruing under 35 U.S.C § 119 from an application entitled *Direct Memory Access Controlling Device*, earlier filed in the Korean Industrial Property Office on the 30$^{th}$ day of Dec. 1995, and there assigned Serial No. 95-69750.

BACKGROUND OF THE INVENTION

The present invention relates to a direct memory access (DMA) controlling device, and more particularly, to a DMA controlling device for temporarily granting a priority of memory use to a microprocessor or another master intending to use a source or destination memory during DMA transmission.

The purpose of DMA transmission is to rapidly transmit data from a specific memory to another memory such that a microprocessor can carry out a different task during the DMA transmission, and thus offers more efficient and excellent system performance.

In order to perform the DMA transmission, a DMA controlling device receives a series of instructions from the microprocessor for transmitting data from a specific memory, i.e., a source memory, to another memory, i.e., a destination memory, and then executes the instructions. A conventional DMA controlling device is comprised of a control register for storing an instruction issued from the microprocessor, a source address generator for generating the address of a source memory which stores data to be transmitted, a destination address generator for generating the address of a destination memory in which the data transmitted from the source memory is to be stored, a count register for storing the number of DMA transmissions which should be carried out, a state register for storing a state occurring during DMA transmission, and a DMA controller for controlling the DMA transmission.

When as many DMA transmissions as the number stored in the count register is performed, the DMA controlling device notifies the microprocessor which issued the instruction of the DMA transmissions, and is set to an initial state to wait for the next instruction. If an error takes place during the DMA transmissions, the error is recorded in the state register and an error interrupt is sent to the microprocessor so that the microprocessor can read the state register and take an appropriate action.

As described above, the conventional DMA controlling device supports only the DMA transmission. When a DMA transmission begins, other masters, for example, a microprocessor or other controllers, cannot access to the memories, i.e., source and destination memories which a DMA controller is using, until an assigned number of DMA transmissions have been completed.

To overcome this drawback, a method of making the amount of DMA transmission data smaller is used so that the time required to perform the DMA transmission is reduced.

However, no great progress is made in such a method because a long standby time is still required for a microprocessor to access to a memory. In a system requiring high-speed performance, delay of a response during CPU processing degrades the system performance. Furthermore, in case of a multiprocessor system having a shared memory structure, many masters frequently compete for access to a shared memory.

As a result, the memory processor should wait for an access to a memory until a DMA transmission is completed. To be worse, a timeout which damages the system may be generated, which counteracts the advantages of using the DMA transmission.

The following patents each disclose DMA controllers having features in common with the present invention. However, none of these patents teach or suggest the specific combination of recited features of the present invention:

U.S. Pat. No. 5,561,821 issued to Gephardt, et al. entitled *System For Performing I/O Access And Memory Access By Driving Address Of DMA Configuration Registers And Memory Address Stored Therein Respectively On Local Bus.*

U.S. Pat. No. 5,471,639 issued Hanington entitled *Apparatus For Arbitrating For A High Speed Direct Memory Access Bus.*

U.S. Pat. No. 5,333,294 issued to Schell entitled *Configurable Data Width Direct Memory Access Device With A Read Address Counter And A Write Address Counter Which Increments The Addresses Based On the Desired Data Transfer Width.*

U.S. Pat. No. 5,313,607 issued to Tokumaru entitled *Direct Memory Access Controller.*

U.S. Pat. No. 5,278,965 issued to Fujihira, et al. entitled *Direct Memory Access Controller.*

U.S. Patent No. 5,018,098 issued to Taniai, et al. entitled *Data Transfer Controlling Apparatus For Direct Memory Access.*

U.S. Pat. No. 5,016,165 issued to Tanikawa, et al. entitled *Direct Memory Access Controlled System.*

U.S. Pat. No. 4,912,632 issued to Gach, et al. entitled *Memory Control Subsystem.*

U.S. Pat. No. 4,722,051 issued to Chattopadhya entitled *Combined Read/Write Cycle For A Direct Memory Access Controller.*

U.S. Pat. No. 4,475,155 issued to Oishi, et al. entitled *I/O Adapter With Direct Memory Access To I/O/ Control Information.*

SUMMARY OF THE INVENTION

To overcome the above problems, it is an object of the present invention to provide a DMA controlling device for temporarily granting a priority for use of a memory to a microprocessor or other masters intending to access a source or destination memory during a DMA transmission, without a long standby time, in order to improve system performance.

It is another object of the present invention to provide a DMA transmission system which includes address and data path controls so that a microprocessor can access the source or destination memory during a DMA transmission by using the DMA controlling device.

To achieve the above object, there is provided a DMA controlling device for controlling a direct memory access (DMA) transmission in a computer system having a microprocessor, a source memory for storing data to be transmitted, and a destination memory for storing transmitted data, the DMA controlling device comprising : a DMA control register for storing an instruction, which is transmitted to the DMA controlling device by the microprocessor for the DMA transmission; a DMA count register for recording a number of DMA transmission; means for generating the address of the source memory during the DMA transmission; means for generating the address of the destination memory during the DMA transmission; a DMA data buffer for temporarily storing data of the source memory before the data of the source memory is transmitted to the destination memory; DMA arbitrating means for arbitrating a memory access priority upon the occurrence of each the DMA transmission cycle when the memory access request is received from at least one master intending to use one of the source and destination memories during the DMA transmission; and DMA engine controlling means for requesting the memory access priority from the DMA arbitrator, transmitting memory control signals to a master which has the memory access priority, and transmitting information regarding the DMA transmission frequency to a DMA count register.

To achieve another object, there is provided a DMA transmission system comprising: a microprocessor for generating the DMA transmission instruction and performing another task during the DMA transmission; DMA controlling means for controlling the stream of data and addresses by performing the instruction received from the microprocessor and generating control signals for address and data buffers; a source memory for storing data to be transmitted; a destination memory for storing transmitted data; a DMA data buffer for temporarily storing data of the source memory before it is transferred to the destination memory during the DMA transmission; a destination data buffer for temporarily storing data transmitted between the microprocessor and the destination memory; a destination address buffer for temporarily storing an address of the destination memory transmitted by the microprocessor; a source address buffer for temporarily storing data transmitted between the microprocessor and the source memory; and a multiplexer for receiving a source memory address output from the DMA controlling means and a source address output from the microprocessor, and outputting one of the source memory address and the source address according to a control signal from the DMA controlling means.

BRIEF DESCRIPTION OF THE DRAWINGS

The above object and advantages of the present invention will become more apparent by describing detail a preferred embodiment thereof with reference to the attached drawings in which.

DETAILED DESCRIPTION OF THE INVENTION

Figure 1:
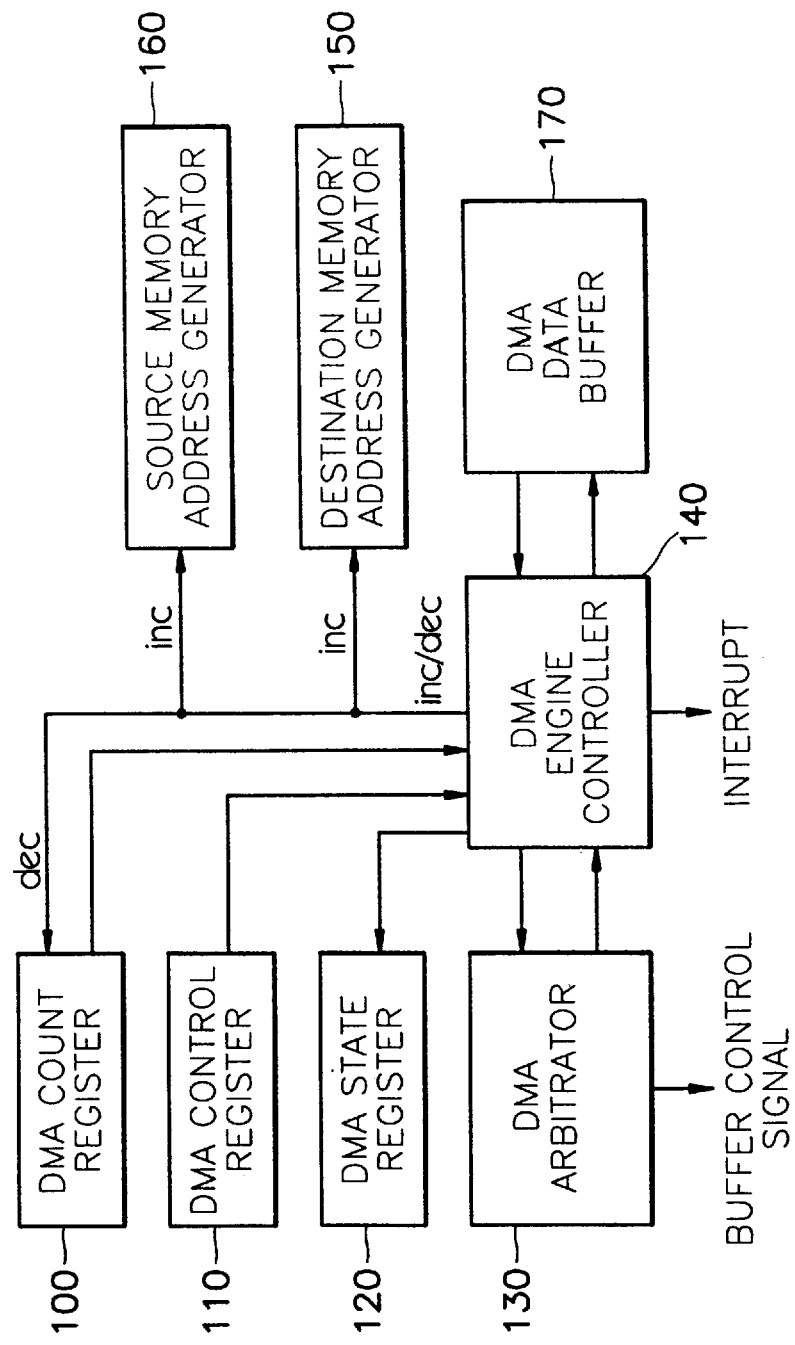
FIG. 1 is a block diagram of DMA controlling device according to a preferred embodiment of the present invention.

Referring to FIG. 1 illustrating a DMA controlling device according to a preferred embodiment of the present invention, a DMA control register 110 stores an instruction for a DMA transmission which is transmitted from a microprocessor to the DMA controlling device. A DMA count register 100 records the number of DMA transmissions. A DMA state register 120 receives information regarding a DMA transmission state from a DMA engine controller 140 and stores such information.

A source memory address generator 160 generates the address of a source memory, and a destination memory address generator 150 generates the address of a destination memory during a DMA transmission. A DMA data buffer 170 temporarily stores the data from the source memory before transmitting it to the destination memory during the DMA transmission.

A DMA arbitrator 130 demarcates a DMA transmission cycle into a first cycle for transmitting data from the source memory to the DMA data buffer 170, and a second cycle for transmitting data from the DMA data buffer 170 to the destination memory. Each of the first and the second cycles will be referred to as basic DMA transmission cycle. If there is a memory access request from at least one master intending to access the source or destination memory, the DMA arbitrator 130 determines a memory access priority upon the occurrence of each basic DMA transmission cycle.

The DMA engine controller 140 requests a memory access priority from the DMA arbitrator 130, generates memory control signals for a DMA transmission and memory control signals required by the master which has the memory access priority, and transmits information regarding the number of DMA transmission to the DMA count register 100.

Figure 2:
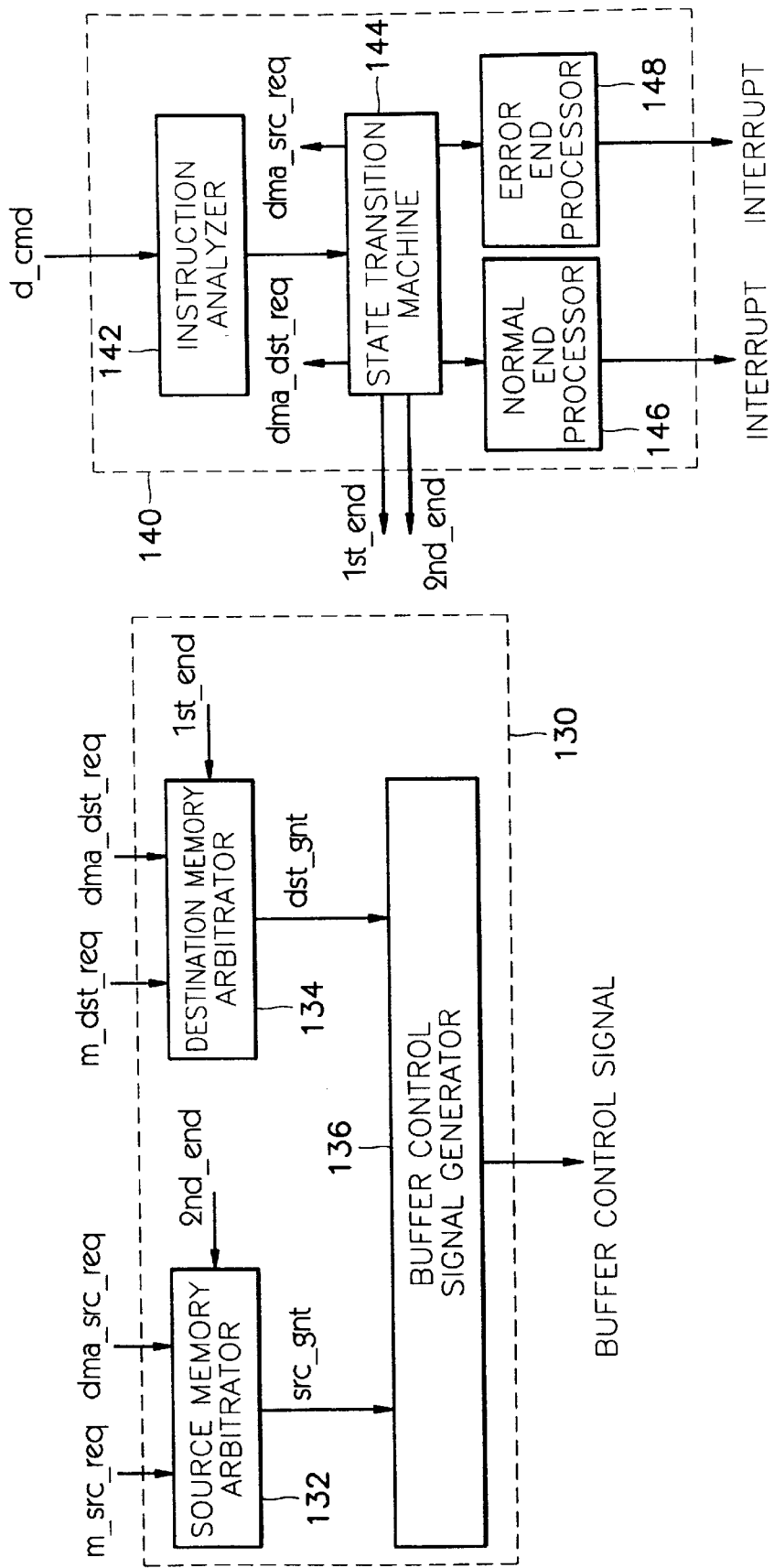
FIG. 2 is a detailed block diagram of the DMA arbitrator and the DMA engine controller 140 shown in FIG. 1.

FIG. 2 is a detailed block diagram of the DMA arbitrator 130 and the DMA engine controller 140 shown in FIG. 1.

The DMA arbitrator 130 has a source memory arbitrator 132, a destination memory arbitrator 134, and a buffer control signal generator 136.

The source memory arbitrator 132 receives a request signal for accessing a source memory from a master intending to use the source memory and determines a memory access priority in the unit of the basic DMA transmission cycle.

The destination memory arbitrator 134 receives a request signal for accessing a destination memory from a master intending to use the destination memory and determines a memory access priority in the unit of the basic DMA transmission cycle.

The buffer control signal generator 136 generates a buffer control signal for storing temporarily address and data bus signals which are generated by a master other than the DMA controlling device and transmitted to the source or destination memory according to the result of the arbitrations of the source and destination memory arbitrators 132 and 134.

The DMA engine controller 140 has an instruction analyzer 142, a state transition machine 144, a normal end processor 146, and an error end processor 148.

The instruction analyzer 142 analyzes an instruction stored in the DMA control register.

The state transition machine 144 receives information informing of a DMA transmission from the source memory to the destination memory, generates a signal requesting use of the source and destination memories to the source and destination memory arbitrators 132 and 134, and generates a control signal for controlling a data and address flow according to a DMA transmission state upon receipt of a memory use priority.

The normal end processor 146 informs the master which requested a DMA transmission of the end of the DMA transmission when the DMA transmission ends normally in the state transition machine 144.

The error end processor 148, informs the master which requested a DMA transmission of the presence of an error if a DMA transmission error takes places in the state transit processor 144.

Referring to the block diagrams of the DMA controlling device shown in FIGS. 1 and 2, the operation of the DMA controlling device will be described.

First, the microprocessor requesting a DMA transmissions transmits a start address of the source memory to the source memory address generator 160, a start address of the destination memory to the destination memory address generator 150, and the number of DMA transmissions to the DMA count register 100 according to the amount of data to be transmitted. Then, the microprocessor transmits an instruction d_cmd for requesting a DMA transmission to the DMA control register 110. Subsequently, the instruction is transmitted to the DMA engine controller 140. The instruction analyzer 142 of the DMA engine controller 140 receives the instruction and determines a DMA transmission path. The state transition machine 144 operates on the basis of the analysis to begin the DMA transmission.

As described before, the DMA transmission cycle is demarcated into the first cycle for transmitting data from a source memory to the DMA data buffer 170, and the second cycle for transmitting the data in the DMA data buffer 170 to a destination memory.

When the first cycle is over, the state transition machine 144 of the DMA engine controller 140 transmits a signal 1st_end indicating the end of the first cycle to the destination memory arbitrator 134 of the DMA arbitrator 130. Similarly, when the second cycle ends, the state transition machine 144 of the DMA engine controller 140 transmits a signal 2nd_end indicating the end of the second cycle to the source memory arbitrator 132 of the DMA arbitrator 130.

In addition, when either of the cycles is over, the DMA engine controller 140 generates a signal dma_dst_req for requesting access to the destination memory or a signal dma_src_req for requesting access to the source memory and transmits such signals to the DMA arbitrator 130 in order to continue the DMA transmission. When the DMA engine controller 140 receives a signal src_gnt for granting a source memory access or a signal dst_gnt for granting a destination memory access, the DMA engine controller 140 inputs the source memory address or the destination memory address generated in the source memory address generator 160 or the destination memory address generator 150, respectively, according to a buffer control signal generated by the buffer control signal generator 136.

When the second cycle ends, that is, transmission of one DMA data block is completed, the DMA engine controller 140 transmits a signal (inc) for incrementing the current address of the source and destination memory address generators 160 and 150, thus preparing the transmission of the next block.

Meanwhile, the DMA engine controller 140 generates a signal dec for decrementing the number of DMA transmission recorded in the DMA count register 100 by one, when the second cycle ends. Subsequently, the DMA count register 100 determines whether the number of DMA transmission is set to zero. If the number is not zero, the DMA engine controller 140 continues the DMA transmission. However, if the number is zero, a count out signal which indicates the end of the entire DMA transmission, cout, is output to the DMA engine controller 140. Afterwards, the normal end processor 146 of the DMA engine controller 140 informs the microprocessor of the end of the DMA transmission by transmitting an interrupt signal, and the DMA transmission is over.

Meanwhile, the DMA engine controller 140 informs the DMA state register 120 of the current status of DMA transmission continuously while the DMA transmission is being performed so that the DMA state register 120 stores such status. When the DMA transmission ends normally or an error occurs during the DMA transmission, the DMA engine controller 140 also stores its related information in the DMA state register 120 and transmits an interrupt signal to the microprocessor via the normal end processor 146 or the error end processor 148 to indicate the end of transmission or an error occurrence so that the microprocessor can take the appropriate actions.

Now, the case in which the microprocessor or other masters intend to use the source or destination memory during a DMA transmission will be described. It is assumed that the microprocessor or other masters transmit the memory access request signals m_src_req and m_dst_req to the DMA arbitrator 130 while the DMA engine controller 140 performs the first or the second cycle. First, the DMA engine controller 140 ends the current cycle. That is, when a memory access is requested during the first cycle, the first cycle is over, and when a memory access is requested during the second cycle, the second cycle is over. Then, a memory access priority is determined by the DMA arbitrator 130. Afterwards, a master which acquires the memory access priority access the memory and the DMA transmission pauses temporarily. After the master has accessed the memory, the DMA controller 140 acquires a memory access priority from the DMA arbitrator 130, thus resuming the DMA transmission.

Figure 3:
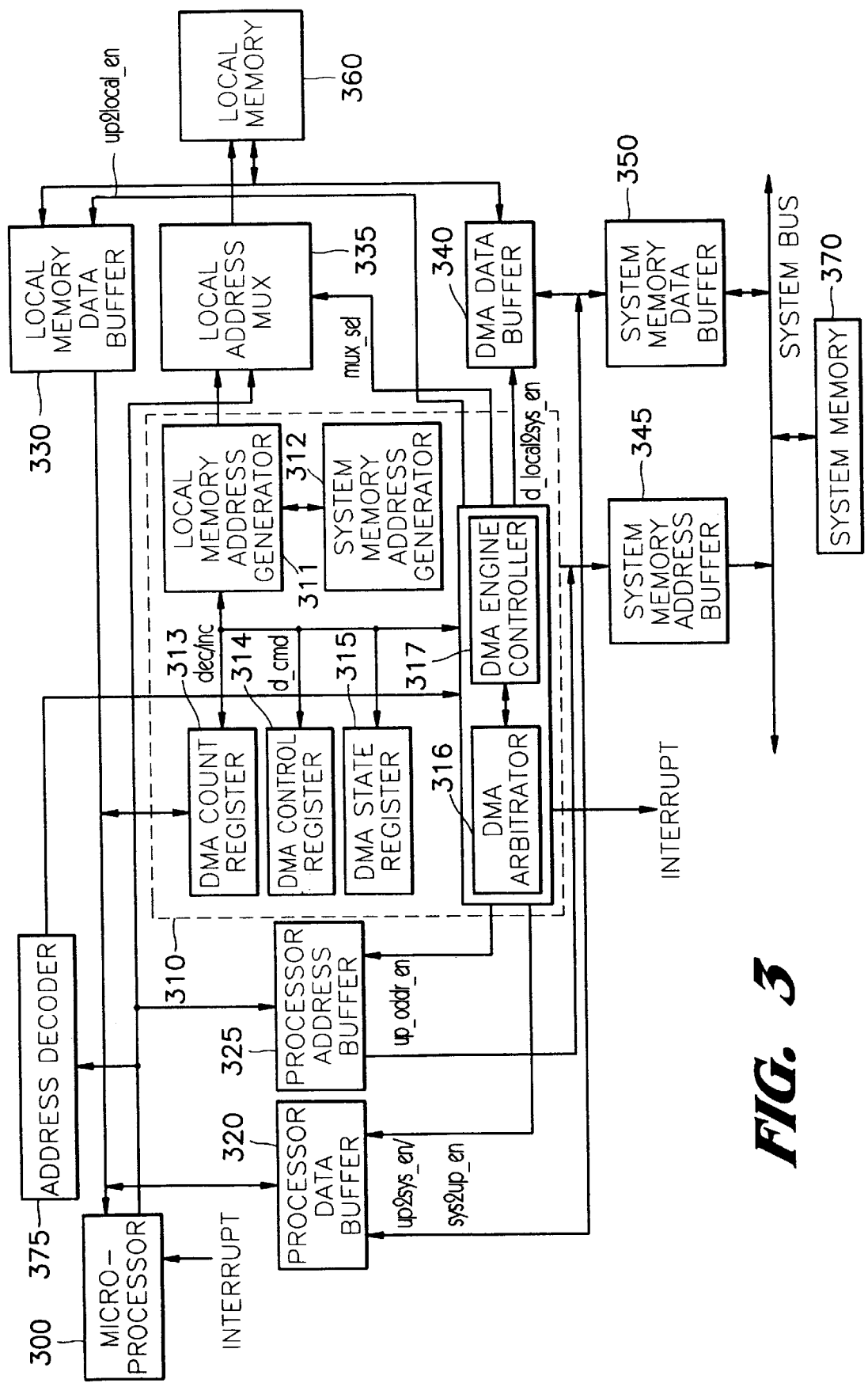
FIG. 3 is a block diagram of a preferred embodiment of a DMA transmission system according to the present invention which uses the DMA controlling device shown in FIG. 1.

FIG. 3 is a block diagram of a preferred embodiment of a DMA transmission system using the above DMA controlling device. Here, it is assumed that masters which access the source memory and the destination memory, are a microprocessor and the DMA controlling device.

The microprocessor 300 generates a DMA transmission instruction and performs another task during a DMA transmission. DMA controlling means 310 receives the DMA transmission instruction from the microprocessor 300, carries out the DMA transmission, and transmits control signals to address buffer 325, address MUX 335, and data buffers 320 and 330 to control the flow of address and data.

A local memory 360, linked to a local bus, serves as a source memory for storing data to be transmitted or a destination memory for storing transmitted data according to a DMA transmission path. A system memory 370, linked to a system bus, also serves as a source or destination memory according to the DMA transmission path.

A DMA data buffer 340 temporarily stores data from the source memory before it is transmitted to the destination memory during a DMA transmission. A processor data buffer 320 temporarily stores data transmitted between the microprocessor 300 and the system memory 370.

The local memory data buffer 330 temporarily stores data transmitted between the microprocessor 300 and the local memory 360. A processor address buffer 325 temporarily stores an address signal transmitted to the system memory 370 by the microprocessor 300.

A local address multiplexer (MUX) 335 receives local memory addresses output from the DMA controlling means 310 and the microprocessor 300 and outputs one of them according to a control signal of the DMA controlling means.

An address decoder 375 decodes an address output from the microprocessor 300 and transmits the decoded address to a DMA arbitrator 316 of the DMA controlling means 310. A system memory address buffer 345 and a system memory data buffer 350 function to buffer an address signal and data signal transmitted to the system memory 370 before they are output to the system bus.

Referring to FIGS. 1 through 3, the operation of the DMA transmission system according to present invention will be described. The DMA controlling means 310 and the DMA data buffer 340 of FIG. 3 correspond to the DMA controlling device of FIG. 1. Here, since the DMA controlling device was described with reference to FIGS. 1 and 2, its full description will be omitted, and address buffer control and data buffer control of the DMA transmission system will be described in detail.

It is assumed that the local memory 360 and the system memory 370 are source and destination memories, respectively, for descriptive simplicity.

The microprocessor 300, requesting a DMA transmission, transmits a starting address of the source memory (local memory 360) to the address generator 311, a starting address of the destination memory (system memory 370) to the address generator 312, and the number of DMA transmissions to be performed according to the amount of data to be transmitted. Then, the microprocessor 300 transmits an instruction d_cmd for requesting a DMA transmission to the DMA control register 314. The DMA engine controller 317 receives the instruction and determines a DMA transmission path. On the basis of the analysis, the state transition machine (not shown) of the engine controller 317 generates signals for controlling the address and data buffers. Thus, the DMA transmission begins.

Here, the DMA transmission is performed through two cycles : a first cycle in which data from the source memory (local memory 360) is transmitted to the DMA data buffer 340, and a second cycle in which data stored in the DMA data buffer 340 is transmitted to the destination memory (system memory 370).

The first cycle is performed as follows. First, the state transition machine of the DMA engine controller 317 generates a selection signal mux_sel (not shown) for selecting the local address MUX 335, and the local memory address generator 311 generates the local memory address from which data is to be read out. The addressed data of the local memory 360 is output and latched in the DMA data buffer 340, and the first cycle is over. Then, the DMA engine controller 317 transmits the signal 1st_end indicating the end of the first cycle to the DMA arbitrator 316.

The second cycle begins after the DMA engine controller 317 obtains a memory access priority from the DMA arbitrator 316. When the DMA engine controller 317 obtains the memory access priority, the controller 317 outputs an output enable signal, d_local2sys_en (not shown), so that the data latched in the DMA data buffer 340 is output and transferred to the system memory 370 via the system memory data buffer 350. When the transferred data is stored in the system memory 370, the second cycle is over and the DMA engine controller 317 outputs a signal indicating the end of the second cycle to the DMA arbitrator 316.

Meanwhile, when either the first or second cycle is over, the DMA arbitrator 317 generates a signal for requesting access to the destination memory (system memory 370) or a signal for requesting access to the source memory (local memory 360) so that access to the source memory or destination memory is arbitrated. When the DMA arbitrator 317 outputs the signal for granting access to the source memory 360 or the signal for granting access to the destination memory 370, the source memory (local memory 360) or the destination memory (system memory 370) inputs a source memory address generated by the source memory address generator 311 or a destination memory address generated in the destination memory address generator 312, respectively, according to a buffer control signal generated by a buffer control signal generator (not shown) of the DMA arbitrator 316.

Meanwhile, when the second cycle is over, that is, one DMA block is completely transmitted, the DMA engine controller 317 transmits a signal, inc, for incrementing the current address by one, to the source and destination memory address generators 311 and 312, thus preparing the transmission of the next block. Also, the DMA engine controller 317 transmits a signal (dec) for decrementing the number of DMA transmissions by one to the DMA count register 313.

Afterwards, the DMA transmission number recorded in the DMA count register 313 is decreased by one. The DMA count register 313 determines whether the NUMBER OF DMA transmission is zero. Here, the DMA transmission continues if the number is not zero. However, if the number is zero, a count out signal is transmitted to the DMA engine controller 317 to indicate the end of all DMA transmissions. Upon receiving the count out signal, the normal end processor (not shown) of the DMA engine controller 317 informs the microprocessor 300 of the end of the DMA transmission by an interrupt.

Meanwhile, the DMA engine controller 317 continuously sends current DMA status information to the DMA state register 315 while the DMA transmission is being performed, and the DMA state register 315 records the current DMA status. When the DMA transmission ends normally or an error occurs during the transmission, the DMA engine controller 317 stores its related information in the DMA state register 315, transmits an interrupt to the microprocessor 300 through the normal end processor or error end processor of the DMA engine controller 316 to indicate the end of the transmission or the occurrence of an error so that an appropriate action can be taken.

The case in which the microprocessor 300 intends to use the source or destination memory during a DMA transmission, will now be described. It is assumed that the microprocessor 300 transmits the memory access request signals to the DMA arbitrator 316 while the DMA engine controller 317 is performing the first or second cycle. Here, said memory access request signal is generated for an address of the local memory 360 or the system memory 370, which is generated by the microprocessor 300 and decoded by the address decoder 375. When the memory access request signal is generated, the DMA engine controller 317 ends the current cycle. That is, when a memory access is requested during the first cycle, the first cycle is over, and when a memory access is requested during the second cycle, the second cycle is over. Then, a memory access priority is determined by the DMA arbitrator 316.

Here, if the microprocessor 300 acquires the memory access priority, the above-described DMA transmission pauses temporarily. If the microprocessor 300 acquires the access priority to the local memory 360, the DMA engine controller 317 receives a signal for permitting the memory access by the microprocessor 300 from the DMA arbitrator 316, and generates a selection signal, mux_sel (not shown), of the local address MUX 335 so that an address generated by the microprocessor 300 is input to the local memory 360. In addition, the DMA engine controller 317 outputs an output enable signal, up2local_en (not shown), of the data buffer 330 to the local memory 360, so that the microprocessor 300 accesses the local memory 360.

If the microprocessor 300 acquires the access priority to the system memory 370 from the DMA arbitrator 316, the buffer control signal generator of the DMA arbitrator 316 transmits an output control signal, up2sys_en or sys2up_en, to the processor data buffer 320 so that the buffer 320 outputs data. The buffer control signal generator also transmits an output control signal, up_addr_en, to the processor address buffer 325 so that an address generated by the microprocessor 300 is input to the system memory 370 via the system memory address buffer 345.

Meanwhile, after the access of the memory by the microprocessor 300 is completed, the DMA engine controller 317 re-gains the priority of the access to the memory from the DMA arbitrator 316, thus resuming the DMA transmission.

In the above description, though the local memory 360 and the system memory 370 are assumed to be a source memory and a destination memory, respectively, it is merely an exemplary application. Therefore, the local memory 360 and the system memory 370 may be designated as the destination and source memories, respectively.

As described above, according to the present invention, the performance of a multiprocessor system requiring high speed balanced with a minimum pause time can be improved by ensuring a general processor cycle as well as a DMA transmission cycle.

Furthermore, timeout and bus errors can be prevented when either the DMA transmission cycle or the microprocessor cycle occupies a memory cycle for a long time, thereby enhancing stability and as a result increasing system efficiency.

What is claimed is:

1. A DMA controlling device for controlling a direct memory access (DMA) transmission in a computer system having a microprocessor, a source memory for storing data to be transmitted, and a destination memory for storing transmitted data, said DMA controlling device comprising:
    a DMA control register storing an instruction, which is transmitted to said DMA controlling device by said microprocessor for the DMA transmission;
    a DMA count register recording a number of DMA transmission;
    means for generating the address of said source memory during the DMA transmission;
    means for generating the address of said destination memory during the DMA transmission;
    a DMA data buffer temporarily storing data of said source memory before the data of said source memory is transmitted to said destination memory;
    a DMA arbitrator arbitrating a memory access priority during a DMA transmission cycle when the memory access request is received from a master intending to use one of said source and destination memories during the DMA transmission; and
    DMA engine controlling means for requesting the memory access priority from said DMA arbitrator, and upon reception of a signal from said DMA arbitrator transmitting memory control signals to a master which has the memory access priority, and transmitting information regarding said DMA transmission frequency to a DMA count register.

2. The DMA controlling device as claimed in claim 1, wherein said DMA arbitrator demarcates the DMA transmission cycle into a first cycle for transmitting data of said source memory to said DMA data buffer and a second cycle for transmitting the data of said DMA data buffer to said destination buffer, and arbitrates the memory access priority upon the occurrence of either the first cycle or the second cycle when the memory access request is received from the master intending to use one of said source and destination memories during the DMA transmission.

3. The DMA controlling device as claimed in claim 2, further comprising a DMA state register for storing DMA transmission status information received from said DMA engine controlling means.

4. The DMA controlling device as claimed in claim 2, wherein said DMA arbitrator comprises:
    a source memory arbitrator arbitrating the memory access priority upon the occurrence of each said DMA transmission cycle when a source memory access request is received from a master intending to access said source memory;
    a destination memory arbitrator arbitrating a memory access priority upon the occurrence of each said DMA transmission cycle when a destination memory use request is received from a master intending to use said destination memory; and
    a buffer control signal generator temporarily storing address and data bus signals transmitted to said source and destination memories by said master according to the result of the arbitration of said source and destination memory arbitrators.

5. The DMA controlling device as claimed in claim 4, wherein said DMA engine controlling means comprises:
    an instruction analyzer analyzing an instruction stored in said DMA control register;
    a state transition machine receiving information regarding the DMA transmission from said source memory to said destination memory from said instruction analyzer, generating a signal requesting use of said source and destination memories to said source and destination memory arbitrators, and generating a control signal for controlling a data and address flow according to the DMA transmission state upon receipt of a memory use priority;
    a normal end processor informing a master, which requested the DMA transmission, of the end of the DMA transmission, when the DMA transmission ends normally in said state transition machine; and
    an error end processor informing a master, which requested the DMA transmission, of the occurrence of an error, when the error occurs during the DMA transmission in said state transition machine.

6. A DMA transmission system, comprising:
    a microprocessor generating the DMA transmission instruction and performing another task during the DMA transmission;
    DMA controlling means controlling the stream of data and addresses by performing said instruction received from said microprocessor and generating control signals for address and data buffers;
    a source memory storing data to be transmitted;
    a destination memory storing transmitted data;
    a DMA data buffer temporarily storing data of said source memory before transfer to said destination memory during the DMA transmission;
    a destination data buffer temporarily storing data transmitted between said microprocessor and said destination memory;
    a destination address buffer temporarily storing an address of said destination memory transmitted by said microprocessor;
    a source address buffer temporarily storing data transmitted between said microprocessor and said source memory;

a multiplexer receiving a source memory address output from said DMA controlling means and a source address output from said microprocessor, and outputting one of said source memory address and said source address according to a control signal from said DMA controlling means;

a DMA arbitrator arbitrating a memory access priority during a DMA transmission cycle when the memory access request is received from a master intending to use one of said source and destination memories during the DMA transmission; and DMA engine controlling means for requesting the memory access priority from said DMA arbitrator, and upon reception of a signal from said DMA arbitrator transmitting information regarding said DMA transmission frequency to a DMA count register.

* * * * *